US005756582A

United States Patent [19]
Mori

[11] Patent Number: 5,756,582
[45] Date of Patent: May 26, 1998

[54] PROCESS FOR PRODUCING SILANE-CROSSLINKED POLYOLEFIN

[75] Inventor: Tsuneharu Mori, Nishinomiya, Japan

[73] Assignee: Sumitomo Bakelite Company Limited, Tokyo, Japan

[21] Appl. No.: 776,317

[22] PCT Filed: Sep. 20, 1996

[86] PCT No.: PCT/JP96/02712

§ 371 Date: Jan. 30, 1997

§ 102(e) Date: Jan. 30, 1997

[87] PCT Pub. No.: WO97/12936

PCT Pub. Date: Apr. 10, 1997

[30] Foreign Application Priority Data

Sep. 29, 1995 [JP] Japan .................. 7-252123

[51] Int. Cl.⁶ ............................................. C08J 3/24
[52] U.S. Cl. ............... 525/193; 525/197; 525/209; 525/222; 525/227; 525/288
[58] Field of Search ........................ 525/193, 197, 525/209, 227, 288, 222

[56] References Cited

U.S. PATENT DOCUMENTS 4,707,517 11/1987 Bullen et al. ......................... 525/72
4,783,511 11/1988 Schmid .............................. 525/431
5,112,919 5/1992 Furrer et al. ....................... 525/263

FOREIGN PATENT DOCUMENTS

| 0416851 | 3/1991 | European Pat. Off. . |
| 0426073 | 8/1991 | European Pat. Off. . |
| 2617108 | 10/1977 | Germany . |
| 3150808 | 6/1983 | Germany . |
| 48-001711 | 1/1973 | Japan . |
| 57-049109 | 3/1982 | Japan . |
| 03-167229 | 7/1991 | Japan . |

*Primary Examiner*—Mark Nagumo
*Attorney, Agent, or Firm*—Browdy and Neimark

[57] ABSTRACT

A process for producing a silane-crosslinked polyolefin which is characterized by melt-blending (i) a polyolefinic base polymer, (ii) a carrier polymer A containing an organic unsaturated silane and a free radical generating agent and containing substantially no water and (iii) a carrier polymer B containing a silanol condensation catalyst and an antioxidant, at a temperature higher than the crystal melting point of the base polymer to effect reaction, and then contacting the resulting reaction product with water to effect crosslinking. The process can provide a silane-crosslinked polyolefin excellent in extrusion processability as well as in crosslinking property, mechanical property and heat resistance.

4 Claims, No Drawings

PROCESS FOR PRODUCING SILANE-CROSSLINKED POLYOLEFIN

TECHNICAL FIELD

The present invention relates, in the silane-crosslinking of polyolefins, a process of silane-crosslinking for producing a silane-crosslinked polyolefin in one step which uses a carrier polymer A containing an organic unsaturated silane and the like in a high concentration and a carrier polymer B containing a silanol condensation catalyst and the like.

BACKGROUND ART

A simple method which has been widely known for crosslinking polyolefins is the so-called silane crosslinking method which comprises grafting an organic unsaturated silane to the polyolefin in the presence of a free radical generating agent to effect silane grafting, and then contacting the resulting silane-grafted polymer with water in the presence of a silanol condensation catalyst to effect crosslinking. This method is disclosed, for example, in JP-B-48-1711 and JP-A-57-49109.

However, this method comprises at least two steps, that is, the silane grafting step and the silanol condensation step. Accordingly, at least two extrusion steps are necessary to obtain the ultimate product, inevitably resulting in economical disadvantage.

An already known one-step process is the monosil process. This process requires a liquid addition apparatus for injecting an organic unsaturated silane in the form of liquid into an extruder, and hence involves the problems of slippage and metering error. Moreover, the process requires an expensive special type extruder with a high L/D ratio to insure uniform dispersion of small amounts of additives, resulting in economical disadvantage. Furthermore, a very high grade technique is necessary in the extrusion.

Another known one-step process is a silane crosslinking method which introduces silane into a solid carrier polymer disclosed in JP-A-3-167229. In this method, however, a porous polymer or EVA is used as the solid carrier polymer and, in addition to silane and a free radical generating agent, such other additives as a silanol condensation catalyst and an antioxidant are introduced to the solid carrier polymer; hence the method involves the problems of low crosslinking efficiency and poor storability caused by oligomerization by condensation of silane or inhibition of crosslinking due to radical capture.

The present invention has been made to overcome the aforesaid problems and has for its object to provide, in the silane-crosslinking of polyolefins, a process of silane-crosslinking for producing a silane-crosslinked polyolefin in one step which uses a carrier polymer A containing an organic unsaturated silane and the like in high concentrations and a carrier polymer B containing a silanol condensation catalyst and the like.

DISCLOSURE OF THE INVENTION

The present invention relates to a process for producing a silane-crosslinked polyolefin which is characterized by melt-blending (i) a polyolefinic base polymer, (ii) a carrier polymer A containing an organic unsaturated silane represented by the formula $RR'SiY_2$, wherein R is a monovalent olefinic unsaturated hydrocarbon group, Y is a hydrolyzable organic group, and R' is a monovalent hydrocarbon group other than aliphatic unsaturated hydrocarbon groups or is the same group as Y, and a free radical generating agent and containing substantially no water and (iii) a carrier polymer B containing a silanol condensation catalyst and an antioxidant, at a temperature higher than the crystal melting point of the base polymer to effect reaction, and then contacting the resulting reaction product with water to effect crosslinking. In this process for producing a silane-crosslinked polyolefin, the base polymer is preferably a polymer selected from the group consisting of polyethylene, polypropylene, copolymer of ethylene and an α-olefin, ethylene-ethyl acrylate copolymer (EEA), ethylene-methyl methacrylate copolymer (EMMA), ethylene-vinyl acetate copolymer (EVA), chlorinated polyethylene (CPE), and the mixtures thereof; the carrier polymer A is preferably a polymer selected from the group consisting of ethylene-ethyl acrylate copolymer (EEA), ethylene-methyl methacrylate copolymer (EMMA), a hydrogenated block copolymer obtained by hydrogenating a block copolymer consisting essentially of a polymer block comprising at least one vinylaromatic compound as the principal monomer unit and a polymer block comprising at least one conjugated diene compound as the principal monomer unit, and the mixtures thereof; the carrier polymer B is preferably a polymer selected from the group consisting of polyethylene, polypropylene, copolymer of ethylene and an α-olefin, and the mixtures thereof; and the total amount of the carrier polymer A and the carrier polymer B is preferably 3–15% by weight.

BEST MODE FOR CARRYING OUT THE INVENTION

The present invention is described in detail below.

The polyolefinic base polymer used in the present invention is not particularly limited and may be, for example, common polyethylene, polypropylene, copolymer of ethylene and an α-olefin (wherein the α-olefin may be $C_3$–$C_{12}$ α-olefins, e.g., propylene, butene-1, pentene-1, octene-1, 4-methylpentene-1, 4-methylhexene-1, 4,4-dimethylpentene-1, nonene-1, decene-1, undecene-1 and dodecene-1), ethylene-ethyl acrylate copolymer (EEA), ethylene-methyl methacrylate copolymer (EMMA), ethylene-vinyl acetate copolymer (EVA), chlorinated polyethylene (CPE), and the mixtures thereof.

The organic unsaturated silane used in the present invention is grafted to the base resin to serve as the point which crosslinks the base resin molecules with each other. The organic unsaturated silane used in the present invention is a compound represented by the formula $RR'SiY_2$, wherein R is a monovalent olefinic unsaturated hydrocarbon group, Y is a hydrolyzable organic group, R' is a monovalent hydrocarbon group other than aliphatic unsaturated hydrocarbon groups or is the same group as Y. Preferably used is an organic unsaturated silane in which R' and Y are the same and which is represented by the formula $RSiY_3$, for example, vinyltrimethoxysilane, vinyltriethoxysilane, vinyltributoxysilane, allyltrimethoxysilane and allyltriethoxysilane.

The amount of the organic unsaturated silane to be added is 0.1–5% by weight, preferably 0.7–3% by weight, based on the total weight of polymers. When the amount is less than 0.1% by weight, a sufficient grafting does not take place. An amount larger than 5% by weight may cause defective molding and also is economically disadvantageous.

The free radical generating agent used in the present invention acts as the initiator of silane grafting. The free radical generating agent used in the present invention may be various organic peroxides and peresters which have a strong polymerization initiating effect, for example, dicumyl peroxide, α,α'-bis(t-butylperoxydiisopropyl)benzene, di-t-butyl peroxide, t-butyl cumyl peroxide, dibenzoyl peroxide, 2,5-dimethyl-2,5-bis(t-butylperoxy)hexane, t-butyl peroxypivalate, and t-butyl peroxy-2-ethylhexanoate. The amount of the agent to be added is 0.01–0.5% by weight, preferably 0.05–0.2% by weight, relative to the total weight of polymers. When the amount is less than 0.01% by weight, the silane grafting does not proceed sufficiently. When the amount is larger than 0.5% by weight, both the extrusion processability and the surface appearance of moldings tend to be poor.

The free radical generating agent and the organic unsaturated silane can be incorporated into the carrier polymer A of the present invention by swelling the carrier polymer A with a liquid mixture obtained by dissolving the free radical generating agent in the organic unsaturated silane. For incorporating the silane into polymer to a high concentration at this time, the carrier polymer A needs to be preheated, but the temperature must not be higher than the crystal melting point of the polymer lest the polymer should undergo melting.

The carrier polymer A must be in the form of granules and must be compatible with the base polymer to be crosslinked and with the silane. The term "compatible" herein means that the carrier polymer A should not readily react with the silane and should be dispersible or soluble in the base polymer. The suitable carrier polymer A is non-hygroscopic. Thus, the moisture absorption rate of the polymer is preferably relatively slow in order to minimize the possibility of premature hydrolysis and condensation of the silane. In any way, substantially no water should be present in the carrier polymer A. The carrier polymer A used in the present invention is usually made into the form of granules, including pellets. Preferred is the form of pellets.

The carrier polymer A used in the present invention may be, for example, ethylene-ethyl acrylate copolymer (EEA), ethylene-methyl methacrylate copolymer (EMMA), a hydrogenated block copolymer obtained by hydrogenating a block copolymer consisting essentially of a polymer block comprising at least one vinylaromatic compound as the principal monomer unit and a polymer block comprising at least one conjugated diene compound as the principal monomer unit, e.g., hydrogenated styrene-isoprene block copolymer (SEPS) and hydrogenated styrene-butadiene block copolymer (SEBS), and the mixtures thereof. Preferred of these is EEA or EMMA.

The silanol condensation catalyst, antioxidant, etc. may be incorporated into the carrier polymer B of the present invention by kneading them with the carrier polymer B, followed by granulation. The carrier polymer B should be in the form of granules and should be a solid compatible with the base polymer to be crosslinked. The carrier polymer B is usually made into the form of granules, including pellets. Preferred is the form of pellets.

The carrier polymer B has a softening point equal to or higher than that of the carrier polymer A.

The carrier polymer B used in the present invention may be, for example, polyethylene, polypropylene, copolymer of ethylene and an α-olefin, wherein the α-olefin may be $C_3$–$C_{12}$ α-olefins, e.g., propylene, butene-1, pentene-1, octene-1, 4-methylpentene-1, 4-methylhexene-1, 4,4-dimethylpentene-1, nonene-1, decene-1, undecene-1, dodecene, and the mixtures thereof.

The silanol condensation catalyst used in the present invention may be such organometallic compounds as dibutyltin dilaurate, stannous acetate, dibutyltin diacetate, dibutyltin dioctoate, lead naphthenate, zinc caprylate, cobalt naphthenate, tetrabutyl titanate, lead stearate, zinc stearate, cadmium stearate, barium stearate and calcium stearate.

The amount of the silanol condensation catalyst to be added is 0.01–0.2% by weight, preferably 0.02–0.1% by weight, based on the total weight of polymers. When the amount is less than 0.01% by weight, the crosslinking reaction does not proceed sufficiently. When the amount is larger than 0.2% by weight, local crosslinking proceeds in the extruder at the time of extrusion, resulting in a greatly deteriorated appearance of the product. The silanol condensation catalyst should be incorporated into the carrier polymer B. This is because if the catalyst is incorporated into the carrier polymer A, oligomerization by condensation of the silane is promoted to cause deterioration of the appearance of products.

The antioxidant used in the present invention may be those conventionally used in processing polyolefins and is not particularly limited, but it should be incorporated into the carrier polymer B. This is because if it is incorporated into the carrier polymer A, crosslinking is inhibited owing to radical capture. Also when other additives are added, those additives which have the possibility of inhibiting crosslinking should be incorporated into the carrier polymer B.

The carrier polymers are added in such amounts that the sum of the amounts of the carrier polymers A and B is in the range of 3–15% by weight. When it is less than 3% by weight, a sufficient grafting does not take place. An amount larger than 15% causes defective molding and is at the same time economically disadvantageous.

As other additives, if necessary and desired, conventionally used additives, for example, neutralizing agents, ultraviolet absorbers, antistatic agents, pigments, dispersants, thickeners, corrosion inhibitors, mildewproofing agents, flow regulators, other inorganic fillers and other synthetic resins, may be added.

The present invention is described below with reference to Examples.

Preparation of Carrier Polymer A

According to the compounding ratio shown in Table 1, first a carrier polymer A was poured into a Super Mixer, mixed with stirring and preheated to 80° C. Then a liquid mixture obtained by dissolving a free radical generating agent in an unsaturated silane was poured into the Super Mixer and, while stirring, the carrier polymer A was impregnated with the liquid mixture for 10 minutes.

Preparation of Carrier Polymer B

According to the compounding ratio shown in Table 2, a carrier polymer B, silanol condensation catalyst, antioxidant, etc. were kneaded by using a pressure kneader and granulated.

* Materials Used
  (1) EEA: ethylene-ethyl acrylate copolymer (EA content: 23% by weight)
  (2) SEPS: hydrogenated styrene-isoprene block copolymer (styrene content: 30% by weight)
  (3) L-LDPE: linear low density polyethylene (density: 0.924 g/cm$^3$, MI: 3.0 g/10 min)
  (4) VTMOS: vinyltrimethoxysilane
  (5) DCP: dicumyl peroxide
  (6) LDPE: low density polyethylene (density: 0.925 g/cm$^3$, MI: 1.5 g/10 min)

(7) PP: polypropylene (homopolymer, MI(230° C.): 2.0 g/10 min)

(8) DBTDL: Dibutyltin dilaurate (9) Antioxidant: phenolic antioxidant/Irganox 1010 (mfd. by Ciba Geigy Corp.)

(10) Lubricant: low molecular weight polyethylene/ Sanwax 171P (mfd. by Sanyo Chemical Industries, Ltd.)

(11) MDPE: medium density polyethylene (density: 0.930 g/cm$^3$, MI: 2.0 g/10 min)

* Method of Evaluation

(12) Silane impregnability: Impregnability was examined by heating and stirring the objective polymer with a VTMOS/DCP liquid mixture in a Super Mixer.

○: well impregnable, ×: not impregnable

(13) Extruded tape appearance 50 mmφ extruder, 120°–150°–170°–180°–170° C.

L/D: 20, compression ratio: 3.5 tape die: width 100 m, lip gap 1 mm

Evaluation: Results were evaluated in the order of ○>Δ>×, the level of ○ being judged as acceptable.

(14) Gel fraction (%): xylene immersion method, 120° C., 20 hours

(15) Tensile strength (MPa) and elongation (%): According to JIS K 6760

(16) Heat deformation (%): According to JIS K6723

A polyolefinic base polymer and the carrier polymers A and B prepared above were blended in the proportions shown in Tables 3 and 4, the blend was extruded with an extruder into a tape and the tape was immersed in warm water, to effect crosslinking. The extruded tape was evaluated for its gel fraction, tensile strength, elongation and heat distortion.

TABLE 1

| Compounding ingredient | A1 | A2 | A3 | A4 | A5 | A6 | A7 |
|---|---|---|---|---|---|---|---|
| EEA | 95 | 100 | | | 95 | 95 | 95 |
| SEPS | 5 | | | | 5 | 5 | 5 |
| L-LDPE | | | 100 | | | | |
| VTMOS | 45 | 40 | 40 | 100 | 2 | 45 | 45 |
| DCP | 2.16 | 1.92 | 1.92 | 4.8 | 0.5 | 0.2 | 20 |
| Silane impregnability | ○ | ○ | × | × | ○ | ○ | ○ |

TABLE 2

| Compounding ingredient | B1 | B2 | B3 | B4 |
|---|---|---|---|---|
| LDPE | 100 | | 100 | 100 |
| PP | | 100 | | |
| DBTDL | 5 | 5 | 0.5 | 25 |
| Antioxidant | 16 | 16 | 16 | 16 |
| Lubricant | 5 | 5 | 5 | 5 |

TABLE 3

| | Example | | | Comparative Example | | | |
|---|---|---|---|---|---|---|---|
| | 1 | 2 | 3 | 1 | 2 | 3 | 4 |
| <Compounding ingredient> | | | | | | | |
| LDPE | 93.5 | | | 93.5 | | | 93.5 |
| L-LDPE | | 93 | | | 93.5 | | |
| MDPE | | | 92.5 | | | 93.5 | |
| A1 | 5 | | | | | | 5 |
| A2 | | 5.5 | 5.5 | | | | |
| A5 | | | | 5 | | | |
| A6 | | | | | 5 | | |
| A7 | | | | | | 5 | |
| B1 | 1.5 | | 2 | | 1.5 | 1.5 | |
| B2 | | 1.5 | | 1.6 | | | |
| B3 | | | | | | | 1.5 |
| <Evaluation item> | | | | | | | |
| Extruded tape appearance | ○ | ○ | ○ | × | ○ | × | ○ |
| Gel fraction (%) | 75 | 74 | 76 | 5 | 10 | 80 | 25 |
| Tensile strength (MPa) | 19 | 21 | 23 | — | 18 | — | 18 |
| Elongation (%) | 450 | 500 | 470 | — | 490 | — | 460 |
| Heat deformation (%) | 12 | 8 | 7 | — | — | — | — |
| Overall evaluation | ○ | ○ | ○ | × | × | × | × |

Note: Symbol — means that determination was impossible.

TABLE 4

| | Comparative Example | | |
|---|---|---|---|
| | 5 | 6 | 7 |
| <Compounding ingredient> | | | |
| LDPE | | 97.5 | |
| L-LDPE | 93.5 | | |
| MDPE | | | 81.5 |
| A1 | | 1 | |
| A2 | 5 | | 17 |
| B1 | | 1.5 | |
| B2 | | | 1.5 |
| B4 | 1.5 | | |
| <Evaluation item> | | | |
| Extruded tape appearance | × | ○ | × |
| Gel fraction (%) | 78 | 20 | 82 |
| Tensile strength (MPa) | — | 18 | — |
| Elongation (%) | — | 460 | — |
| Heat deformation (%) | — | — | — |
| Overall evaluation | × | × | × |

Note: Symbol — means that determination was impossible.

As is apparent from Tables 3 and 4, the materials shown in Examples 1, 2 and 3 show good extrusion processability and quite excellent crosslinking property, mechanical property and heat resistance.

In contrast, the materials shown in Comparative Examples are all poorly balanced among extrusion processability, crosslinking property, mechanical property and heat resistance.

INDUSTRIAL APPLICABILITY

The process of the present invention is a very useful silane crosslinking process which can provide silane-crosslinked polyolefins excellent in extrusion processability as well as in crosslinking property, mechanical property and heat resistance.

What is claimed is:

1. A process for producing a silane-crosslinked polyolefin which is characterized by melt-blending (i) polyolefinic base polymer, (ii) a carrier polymer composition containing a carrier polymer A, an organic unsaturated silane represented by the formula $RR'SiY_2$, wherein R is a monovalent olefinic unsaturated hydrocarbon group, Y is a hydrolyzable organic group, and R' is a monovalent hydrocarbon group other than aliphatic unsaturated hydrocarbon groups or is the same as Y, and a free radical generating agent and containing substantially no water, wherein the carrier polymer A does not react with the organic unsaturated silane, is in the form of granules, and is selected from the group consisting of ethylene-ethyl acrylate copolymer (EEA), ethylene-methyl methacrylate copolymer (EMMA) and the mixtures thereof, and wherein the amount of the organic unsaturated silane is 0.1–5% by weight based on the total weight of polymers, and the amount of the free radical generating agent is 0.01–0.5% by weight based on the total weight of polymers, and (iii) a carrier polymer composition containing a carrier polymer B, a silanol condensation catalyst and an antioxidant, wherein the carrier polymer B has a higher softening point than the carrier polymer A and wherein the amount of the silanol condensation catalyst is 0.01–0.2% by weight based on the total weight of polymers, in such amounts that the sum of the amount of the two carrier polymer compositions (ii) and (iii) is in the range of 3–15% by weight based on the total weight of (i), (ii) and (iii), at a temperature higher than the crystal melting point of the base polymer to effect reaction, and then contacting the resulting reaction product with water to effect crosslinking.

2. The process for producing a silane-crosslinked polyolefin according to claim 1 wherein the base polymer is selected from the group consisting of polyethylene, polypropylene, copolymer of ethylene and an α-olefin, ethylene-ethyl acrylate copolymer (EEA), ethylene-methyl methacrylate copolymer (EMMA), ethylene-vinyl acetate copolymer (EVA), chlorinated polyethylene (CPE), and the mixtures thereof.

3. The process for producing a silane-crosslinked polyolefin according to claim 2, wherein the carrier polymer B is selected from the group consisting of polyethylene, polypropylene, copolymer of ethylene and an α-olefin, and the mixtures thereof.

4. The process for producing a silane-crosslinked polyolefin according to claim 1 wherein the carrier polymer B is selected from the group consisting of polyethylene, polypropylene, copolymer of ethylene and an α-olefin, and the mixtures thereof.

* * * * *